April 27, 1926.

J. C. BUCHENAU ET AL 1,582,729

CAR FENDER

Original Filed March 18, 1925    2 Sheets-Sheet 1

WITNESSES

INVENTOR
John C. Buchenau
Edward R. Bishop
BY
ATTORNEYS

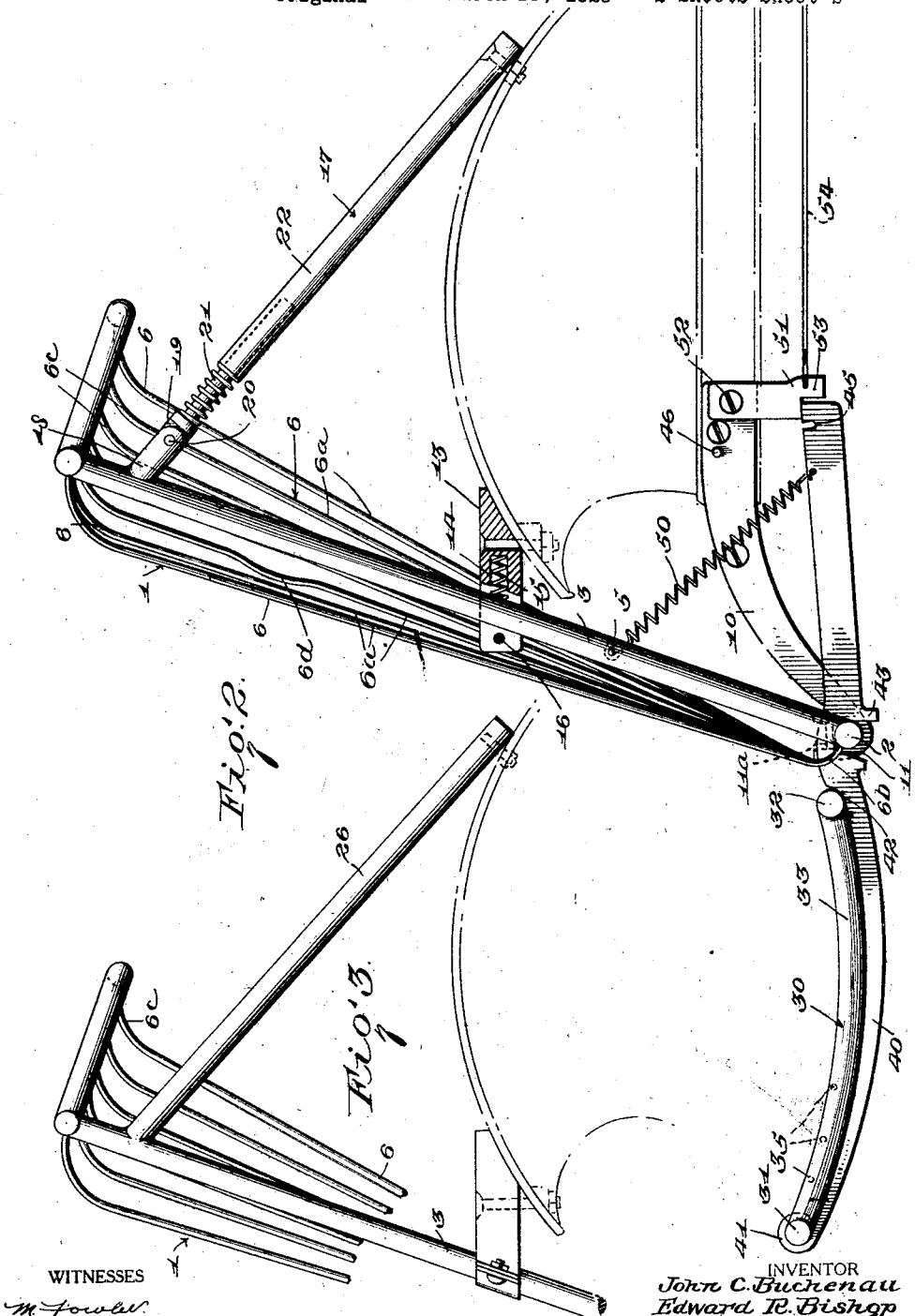

Patented Apr. 27, 1926.

1,582,729

UNITED STATES PATENT OFFICE.

JOHN CASPER BUCHENAU AND EDWARD ROSENCRANS BISHOP, OF SYRACUSE, NEW YORK.

CAR FENDER.

Application filed March 18, 1925, Serial No. 16,460. Renewed January 9, 1926.

*To all whom it may concern:*

Be it known that we, JOHN C. BUCHENAU and EDWARD R. BISHOP, citizens of the United States, and residents of Syracuse, in the county of Onondaga and State of New York, have invented certain new and useful Improvements in Car Fenders, of which the following is a specification.

This invention relates to an improvement in fenders especially designed for use on automobiles.

The object of the invention is to provide a device of this character whereby in the event a person is struck by the automobile on which the fender is carried he will be tripped and caught in the fender and will not be knocked away from the machine and will not be run over or otherwise seriously injured.

Another object resides in the provision of a fender having a scoop portion or section which may be normally elevated to the level of the road clearance of the car or which may be lowered to a position on or just above the ground.

A further object resides in the provision of a fender of this character wherein the scoop part is positively connected to the frame of the vehicle when in its lower position.

A still further object resides in the provision of a device of this character which is of strong and durable construction, which is reliable and effective in operation and easy and comparatively inexpensive to manufacture.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 3 is a fragmentary view in side elevation showing a slightly modified form of the invention.

Figure 1:
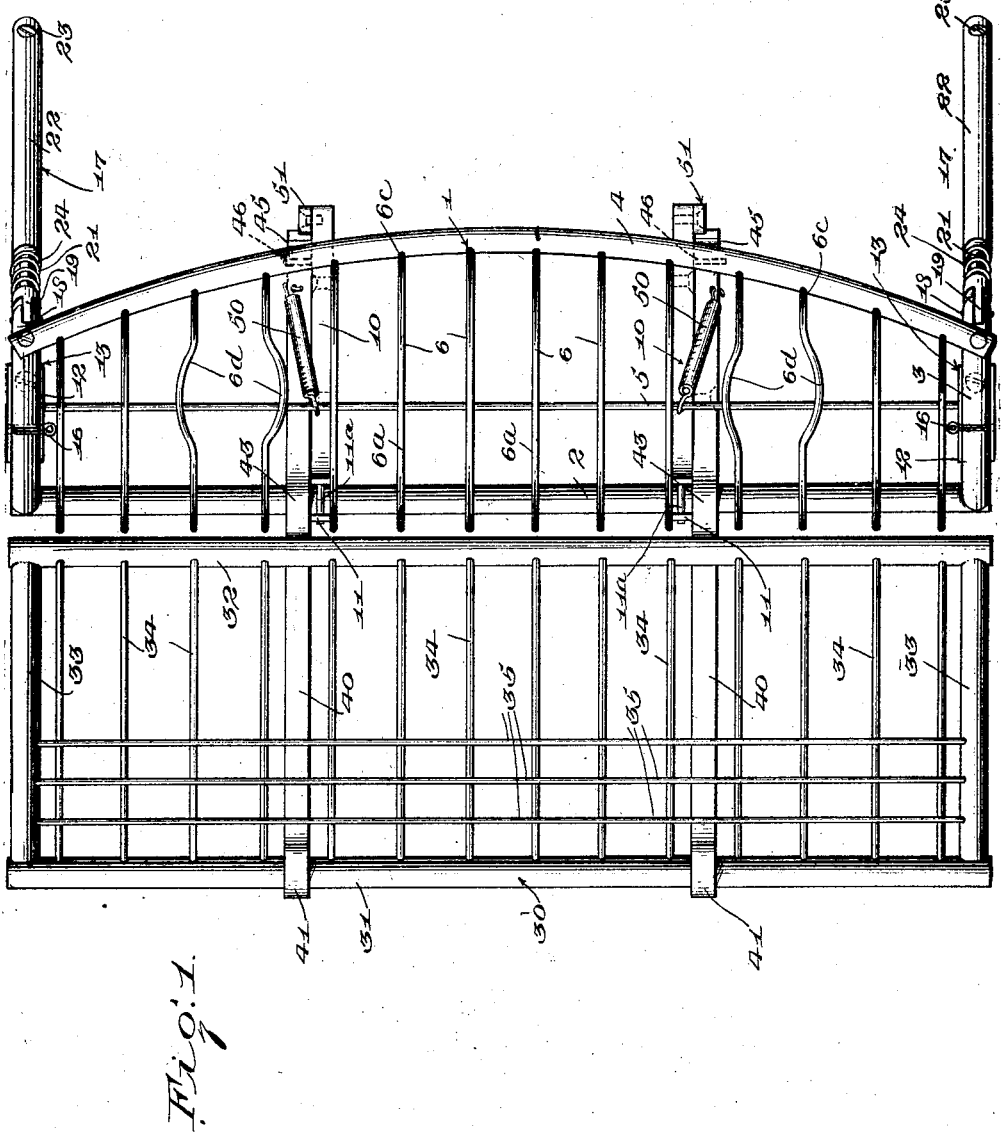
Figure 1 is a plan view of a fender embodying the invention applied to the frame of an automobile, parts being shown in section for the sake of illustration and, Figure 2 is a view thereof in side elevation.

Referring to the drawings the numeral 1 designates generally the relatively fixed or main section of the fender. The fixed section 1 includes a lower horizontal bar 2, rearwardly and upwardly extending side bars 3, and a rearwardly curved upper or top bar 4. The ends of the bars 2, 3, and 4 are fixedly secured to each other in any suitable manner. A brace bar 5 extends between and has its ends secured to the side bars 3. A plurality of parallel rods 6 extend between the upper and lower bars 4 and 2. The rods 6 having substantially straight body portions $6^a$, rearwardly curved lower ends $6^b$ and rearwardly curved upper ends $6^c$, the ends $6^b$ being secured to the lower bar 2 and the ends $6^c$ being secured to the upper bar 4. Certain of the rods 6 have laterally offset portions $6^d$ to provide unobstructed openings for the beams proceeding from the headlights of the vehicle. The rods 6 provide an open-work covering or body portion for the relatively fixed section of the fender and due to the rearward curvature of the top bar 4, this open-work covering or body portion extends rearwardly from each side toward its center so as to tend to prevent anybody striking the same from being displaced laterally thereof. The curvature of the ends of the rods 6 give these parts some resiliency although the rods are sufficiently rigid to serve their purposes.

Fixed supporting arms 10 are carried by the frame of the automobile or other vehicle on which the fender is mounted and at their forward ends the arms 10 have bearings 11 in which the lower bar 2 of the frame of the relatively fixed section 1 is pivotally supported. The bearings 11 positively prevent forward, rearward or downward displacement of the bar 2 but permit it to rotate about its own axis. Keeper pins $11^a$ associated with the bearings 11 prevent upward displacement of the main section.

Intermediate their ends the bars 3 of the relatively fixed section are fitted between the arms 12 of bifurcated brackets 13, the brackets being secured to the automobile and being provided with sockets 14 receiving coil springs 15 which engage the bars 3 and resiliently resist rearward swinging movement of the fixed section 1. Excessive forward swinging movement of the section 1 is prevented by means of a pin 16 extending transversely between and secured to the arms of each bracket.

Resilient means is provided for bracing the upper end of each side bar 3 against rearward swinging movement and preferably comprises a pair of brace members designated generally at 17, there being one brace member 17 for each side bar 3 and the brace members 17 being of identical construction.

Each brace member 17 includes a bifurcated fixed lug 18 rigidly fastened to its side bar 3. A lug 19 is inserted between the bifurcations of the lug 18 and is pivotally connected thereto as at 20. The lug 19 is fastened to the upper end of a rod 21 which is telescopically fitted in the upper end of a tubular rod 22. The lower end of the tubular rod 22 is fastened as at 23 to the vehicle. A coil spring 24 encircles the rod 21 and engages the upper end of the rod 22 as at its lower end and a shoulder 25 on the lug 19 at its upper end. When the section 1 swings rearwardly it does so against the action of the spring 24 as well as against the action of the spring 15.

In the modified mounting shown in Figure 3, the brace members 17 are replaced by rigid brace bars 26 and the brackets 13 are omitted or else clamped or fastened positively to the side bars. In any event the springs 15 are omitted.

A pivoted scoop section designated generally at 30 is provided and includes a frame made up of a front bar 31 a rear bar 32 and curved side bars 33. Parallel rods 34 corresponding in curvature to the side bars 33 extend between and are secured to the front and rear bars 31, and 32. A number of rods 35 extend across the tops of the rods 34 and are secured to the side bars 33. The rods 34 and 35 make up the body or openwork covering of the scoop section and by virtue of the provision of the rods 35, the foot or hand of the person caught in the fender is prevented from passing through the scoop section without providing an unnecessarily large number of rods 34.

Rocker arms 40 are provided for mounting the scoop section 30 on the bar 2 of the relatively fixed section. At their forward ends the rocker arms 40 are fastened to the front bar 31 of the frame of the scoop section as indicated at 41 and intermediate their ends the arms 40 have seats 42 receiving the rear bar 32 of the scoop section frame. Bearings 43 are provided on the rocker arms and are engaged with the bar 2 of the fixed section to support the scoop section on the fixed section for rocking movement.

The rocker arms 40 are disposed closely adjacent to the supporting arms 10 and at their rear ends these rocker arms have notches 45 in their upper sides. Pins 46 project laterally of the arms 10 and when the pins 46 are engaged with the walls of the notches they not only limit the downward swinging movement of the scoop section but also provide a positive connection between the rocker arms and the supporting arms so that the shocks and strains of impact are taken from the scoop section through the rocker arms 40, and pins 46 to the supporting arms 10 and thence to the frame of the vehicle. This is an advantageous feature especially as the bearings are relieved of strain.

Retractile coil springs 50 connected to the brace bar 5 and to the rear ends of the rocker arms 40 tend to lower the scoop section and to engage the pins 46 with the notches 45. When the scoop section is lowered its forward end lies on or close to the ground but when it is elevated the fender has the same road clearance as the car.

Readily releasable means is provided for holding the scoop section elevated against the tension of the springs 50 and comprises a pair of trip arms 51 pivotally mounted at their upper ends as at 52 and having notched lower ends 53 engageable with the rear ends of the rocker arms 40 to hold them depressed. An operating element 54 is connected with the trip arms 51 to facilitate their quick release.

In operation when the scoop section of the fender is lowered it will serve to pick up or trip a person struck into the fender. A person struck will not be knocked away from the vehicle and seriously injured and will not be run over. If the person falls up against the relatively fixed section 1 it yields somewhat to take up the force of impact and by virtue of its structure will prevent the person from falling off of the sides of the fender. The trough like formation of the scoop prevents a person caught on the fender from rolling over the forward edge thereof.

The fender extends across the full width of the car. It is to be understood, of course, that the scoop section is mounted on the main section.

We claim:

1. In a fender, a main section including a frame made up of a horizontal lower bar, an upper bar rearwardly curved from its ends toward its center, side bars connecting the lower bar and upper bar, a plurality of rods between the upper and lower bars, and a scoop section associated with the main section.

2. In a fender, a main section including a frame made up of a horizontal lower bar, an upper bar rearwardly curved from its ends toward its center, side bars connecting the lower bar and upper bar, a plurality of rods between the upper and lower bars, and a scoop section associated with the main section and comprising a frame having front and rear bars and curved side bars and longitudinal rods having a curvature like the side bars and connected to the front and rear bars.

3. In a fender, a scoop section including a frame having side bars downwardly curved from their ends to their centers and a body portion conforming to the curvature of the side bars and comprising curved longitudinal rods and transverse rods overlying the longitudinal rods.

4. In a fender a main section, a scoop section, means for pivotally mounting the scoop section on the main section to permit the scoop section to be raised or lowered, spring means tending to lower the scoop section, and readily releasable means for holding the scoop section raised.

5. A fender for use with vehicles having a frame and including a main section, supporting arms independent of the frame, connected thereto and having means for pivotally supporting the main section, resilient means for holding the main section in position, and a scoop section associated with the main section.

6. A fender for use with vehicles having a frame and including a main section, supporting arms connected to the frame and pivotally supporting the main section, resilient means for holding the main section in position, and including brackets having springs engaged with the main section and brace members for the main section, said brace members including telescoping rods, and springs for resisting telescopic movement of the rods, and a scoop section associated with the main section.

7. A fender for use with vehicles having a frame and including a main section, supporting arms connected to the frame and to the main section, a scoop section, rocker arms connected to the scoop section and pivoted on the main section, and interengaging means between the rocker arms and supporting arms for positively connecting the scoop section to the supporting arms when the scoop section is positioned for operation.

8. A fender for use with vehicles having a frame and including a main section, supporting arms connected to the frame and to the main section, a scoop section, rocker arms connected to the scoop section and pivoted on the main section, and interengaging means between the rocker arms and supporting arms for positively connecting the scoop section to the supporting arms when the scoop section is positioned for operation said interengaging means including pins on the supporting arms, said rocker arms having notches receiving the pins.

9. In a fender, a main section having straight side bars, an upper bar connecting the upper ends of the side bars and rearwardly curved from its ends toward its center, a horizontal lower bar connecting the lower ends of the side bars, an open work body portion extending between the bars and partaking of the curvature of the upper bar, said main section being adapted to extend across the front of the car for the full width of the car, means coacting with the lower bar and with the side bars for supporting and holding the main section in position extending rearwardly and upwardly at a slight angle from the vertical and for substantially the full height of the front of the car, and a scoop section associated with the main section.

JOHN CASPER BUCHENAU.
EDWARD ROSENCRANS BISHOP.